W. H. PRATT.
Farm-Gate.

No. 163,693.

Patented May 25, 1875.

WITNESSES:
E. Wolff
A. F. Terry

INVENTOR:
W. H. Pratt
BY
ATTORNEYS.

UNITED STATES PATENT OFFICE.

WELLINGTON H. PRATT, OF PRATTSVILLE, MICHIGAN.

IMPROVEMENT IN FARM-GATES.

Specification forming part of Letters Patent No. 163,693, dated May 25, 1875; application filed February 5, 1875.

*To all whom it may concern:*

Be it known that I, WELLINGTON H. PRATT, of Prattsville, Hillsdale county, Michigan, have invented a new and useful Improvement in Farm-Gates, of which the following is a specification:

The invention will first be fully described, and then pointed out in the claim.

Figure 1:
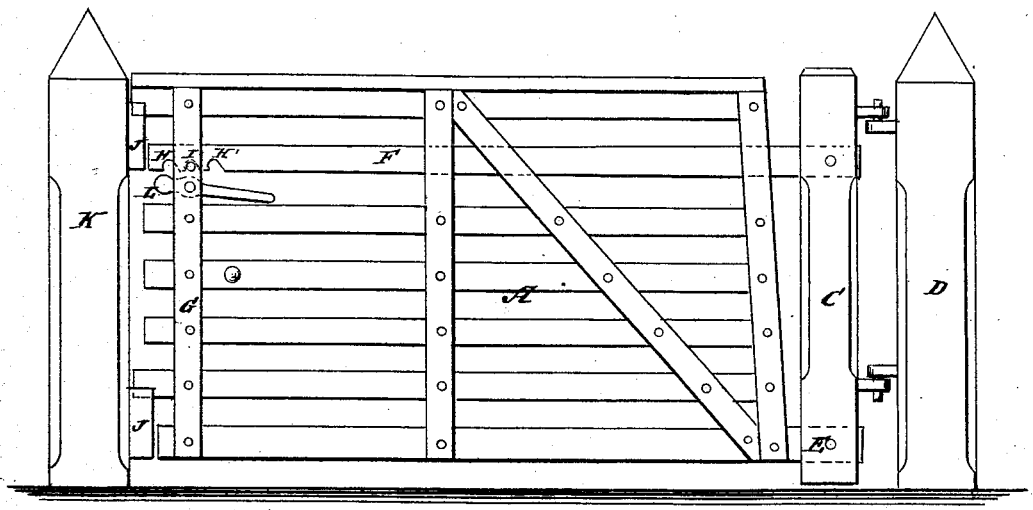
Figure 2:
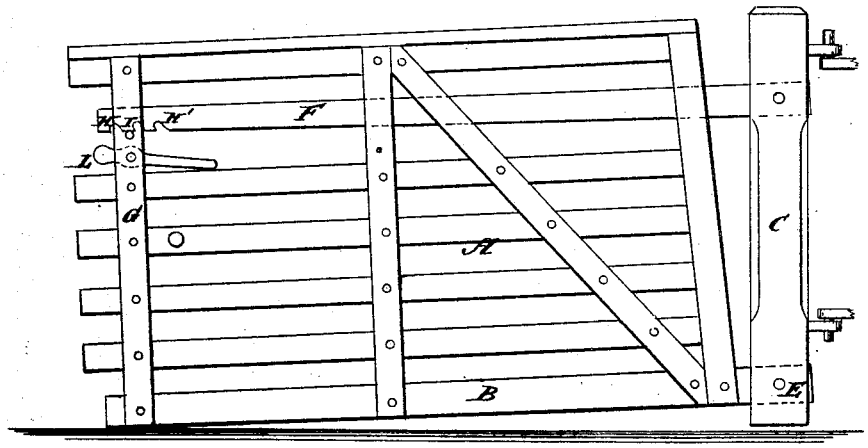

Figure 1 is an elevation of the gate, showing the gate-posts, and supported by the hooked bar; and Fig. 2 is a view of the gate detached from the posts, showing it as when not supported by the hooked bar and resting on the ground.

Similar letters of reference indicate corresponding parts.

A is the gate, made similar to ordinary gates, but having its lower rail B extended and pivoted to the hinged upright C. This upright is hinged to the gate-post D, and turns when the gate is opened and closed. E is the lower pivot. F is a bar, which passes longitudinally between the two upper rails of the gate, the rear end of which is pivoted to the swinging upright C. This bar extends forward between the uprights G, and is provided with one or more hooks, H, which are made to engage with a pin, I, through the upright when the gate is to be supported off the ground. There is play between the two upper rails, for this bar to be raised from and to be lowered onto the pin.

When placed as seen in Fig. 1, one of the hooks or recesses H is engaged with the pin I, which supports the gate and prevents it from sagging. When the inside hook H' is engaged with the pin the gate is raised from a horizontal position, and may then be swung round over a moderate depth of snow without obstruction. When the hooks are all detached from the pin, as seen in Fig. 2, the front end of the gate will drop and rest upon the ground when the gate is opened, and, of course, will remain in any position in which it may be placed. This is a great convenience in counting sheep and other stock, as farmers are well aware.

The gate is rigid and stiff, and is strongly made. There is no "give" in the joints when the front drops, as seen in Fig. 2. It turns on the lower pivot E, while it is kept upright by the bar F.

When the gate is closed it is held in position by the catches J J on the front gate-post K. L is a handle, pivoted to the front upright, to assist in raising the bar F.

This gate is cheaply made, and is strong and durable, and extremely convenient for the farmer.

I am aware that it is not new, in rising gates, to have a guide-bar pivoted to the gate-post, and a vertical lever pivoted to the guide-bar, these being connected with a pivoted bar in the gate itself; but

What I claim is—

The end notched and pivoted latch-bar F, combined with pivoted gate A and hinged post C, as and for the purpose specified.

WELLINGTON H. PRATT.

Witnesses:
T. B. MOSHER,
ALEX. F. ROBERTS.